US012803369B2

(12) United States Patent
Oshidari

(10) Patent No.: US 12,803,369 B2
(45) Date of Patent: Nov. 17, 2026

(54) UNIT

(71) Applicant: JATCO Ltd, Fuji (JP)

(72) Inventor: Toshikazu Oshidari, Yokosuka (JP)

(73) Assignee: JATCO Ltd, Fuji (JP)

( * ) Notice: Subject to any disclaimer, the term of this patent is extended or adjusted under 35 U.S.C. 154(b) by 135 days.

(21) Appl. No.: 18/878,820

(22) PCT Filed: May 25, 2023

(86) PCT No.: PCT/JP2023/019479
§ 371 (c)(1),
(2) Date: Dec. 24, 2024

(87) PCT Pub. No.: WO2024/004460
PCT Pub. Date: Jan. 4, 2024

(65) Prior Publication Data
US 2025/0219496 A1 Jul. 3, 2025

(30) Foreign Application Priority Data
Jul. 1, 2022 (JP) ................................ 2022-107072

(51) Int. Cl.
*H02K 5/20* (2006.01)
*H02K 9/19* (2006.01)

(52) U.S. Cl.
CPC .............. *H02K 5/203* (2021.01); *H02K 9/19* (2013.01)

(58) Field of Classification Search
CPC ........... H02K 5/203; H02K 9/19; H02K 5/00; H02K 5/02; H02K 5/04; H02K 5/06; H02K 5/12; H02K 5/132; H02K 5/136; H02K 5/20; H02K 9/00; H02K 9/08; H02K 9/10; H02K 9/22; H02K 9/225
See application file for complete search history.

(56) References Cited

U.S. PATENT DOCUMENTS

2023/0179060 A1* 6/2023 Sridhar ................. H02K 11/33 310/54

FOREIGN PATENT DOCUMENTS

JP 2019009433 A * 1/2019
WO WO-2021236565 A1 * 11/2021 ............ H02K 9/197

* cited by examiner

*Primary Examiner* — Naishadh N Desai
(74) *Attorney, Agent, or Firm* — Foley & Lardner LLP

(57) ABSTRACT

A unit includes a housing having a spiral groove formed such that a coolant flows along a circumferential direction, a rotating electrical machine provided in the housing, and a fiber body, and the fiber body is disposed in the spiral groove.

6 Claims, 6 Drawing Sheets

UNIT

TECHNICAL FIELD

The present invention relates to a unit.

BACKGROUND ART

Patent Document 1 discloses a cooling member in which metal fibers are filled in an accommodating body and cooling is performed using a high thermal conductivity of the metal fibers.

PRIOR ART DOCUMENT

Patent Document

Patent Document 1: JP 2019-009433 A

SUMMARY OF INVENTION

As a result of diligent studies, the present inventors have found that when a coolant passes through fibers, turbulence is generated, and cooling is promoted by an effect of the turbulence. Furthermore, it has been found that when the coolant passes through a surface of the fibers, turbulence is generated due to disorder of the surface of the fibers, and the cooling is promoted by an effect of the turbulence. According to the findings, it means that the cooling property can be enhanced regardless of the material of a fiber body, and the fiber body can be used in a form completely different from concepts described in Patent Document 1.

An object of the present invention is to provide a novel structure of a use form of a fiber body based on the above concepts.

According to an aspect of the present invention, a unit includes a housing having a spiral groove formed such that a coolant flows along a circumferential direction, a rotating electrical machine provided in the housing, and a fiber body, and the fiber body is disposed in the spiral groove.

According to an aspect of the present invention, by providing a fiber body in a spiral groove, turbulence is caused in the spiral groove, and the cooling efficiency of a rotating electrical machine through a coolant can be improved. Accordingly, it is possible to provide a novel structure of a use form of a fiber body.

DESCRIPTION OF EMBODIMENTS

Hereinafter, a drive unit 1 as a unit according to an embodiment of the present invention will be described with reference to the drawings.

First, the drive unit 1 will be described with reference to FIGS. 1 and 2.

Figure 1:
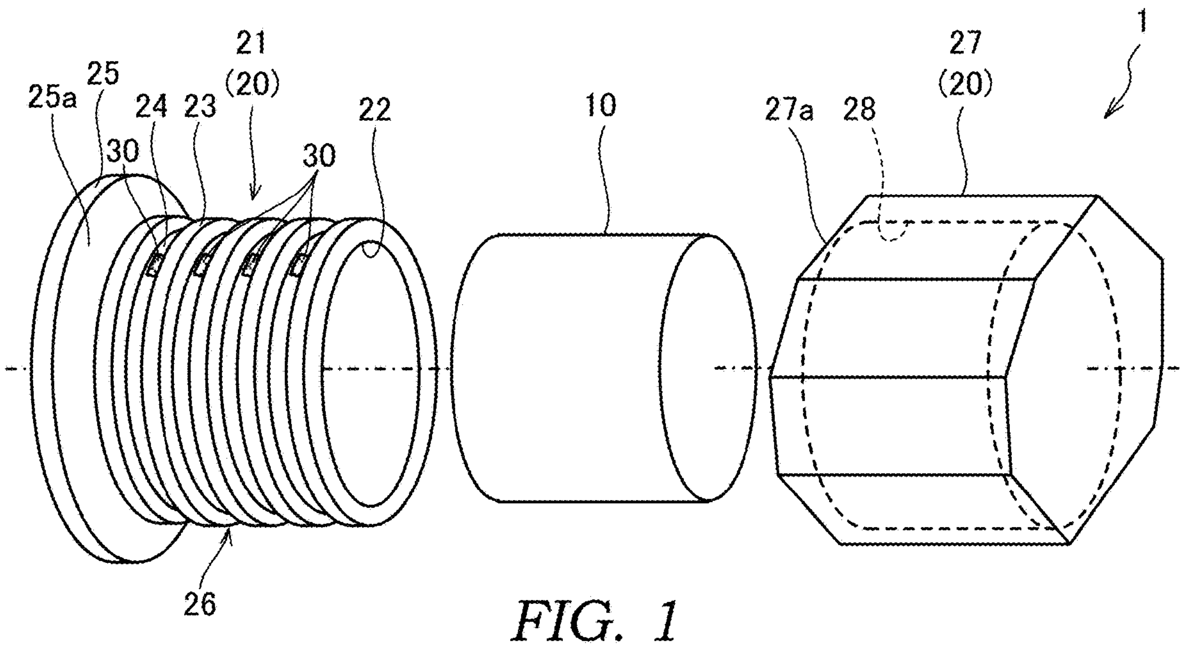
FIG. 1 is an exploded perspective view of a unit according to an embodiment of the present invention.

FIG. 1 is an exploded perspective view of the drive unit 1. FIG. 2 is a front view of an inner case 21 in a housing 20 of the drive unit 1.

As shown in FIG. 1, the drive unit 1 includes a rotating electrical machine 10, the housing 20, and fiber bodies 30. The drive unit 1 is an electric drive unit that rotationally drives drive wheels (not shown) of a vehicle using a drive force of the rotating electrical machine 10. The unit is used to drive the drive wheels of the vehicle, but is not limited thereto, and may be used to drive an electrical product, for example.

The rotating electrical machine 10 functions as an electric motor and/or a generator. The rotating electrical machine 10 is formed in a substantially cylindrical shape. The rotating electrical machine 10 includes a stator that is fixed to the housing 20 and a rotor that rotates together with an output shaft (not shown).

The housing 20 accommodates the rotating electrical machine 10. The housing 20 includes an inner case 21 and an outer case 27.

The inner case 21 is formed in a substantially cylindrical shape. The inner case 21 includes a motor accommodating portion 22, spiral ribs 23, spiral grooves 24, and a flange portion 25.

The motor accommodating portion 22 is formed to have substantially the same inner diameter as an outer diameter of the rotating electrical machine 10. The rotating electrical machine 10 is accommodated in the motor accommodating portion 22. The stator of the rotating electrical machine 10 is fixed to the motor accommodating portion 22.

Each of the spiral ribs 23 is formed to protrude from an outer peripheral surface of the inner case 21. The spiral rib 23 is formed in a spiral shape in an axial direction (an extending direction of a rotary shaft of the rotating electrical machine 10). The spiral rib 23 is in contact with an inner peripheral surface of an inner case accommodating portion 28 to be described later of the outer case 27.

Each of the spiral grooves 24 is a spiral groove continuously formed between a pair of spiral ribs 23 adjacent to each other in the axial direction. Coolant water as a coolant for cooling the rotating electrical machine 10 passes through the spiral groove 24. The coolant is not limited to the coolant water, and may be another liquid such as coolant oil. One end of the spiral groove 24 is provided with a coolant inlet (not shown) for introducing coolant water for cooling the rotating electrical machine 10 into the spiral groove 24. The other end of the spiral groove 24 is provided with a coolant outlet (not shown) for leading out the coolant water after cooling the rotating electrical machine 10 from the spiral groove 24.

The flange portion 25 is provided at an end of the inner case 21 in the axial direction. The flange portion 25 is formed in a substantially circular plate shape having a larger diameter than the spiral rib 23. One flat surface of the flange portion 25 constitutes an end surface 25*a*.

The outer case 27 is a substantially bottomed cylindrical member that covers an outer periphery of the inner case 21. The outer case 27 forms an outer shape of the drive unit 1. An end surface 27*a* of the outer case 27 is in contact with the end surface 25*a* of the flange portion 25 of the inner case 21. The outer case 27 includes the inner case accommodating portion 28.

The inner case accommodating portion 28 is formed to have substantially the same inner diameter as an outer diameter of the spiral rib 23 of the inner case 21. While the inner case 21 is accommodated in the inner case accommodating portion 28, an outer peripheral surface of the spiral rib 23 is in contact with the inner peripheral surface of the inner case accommodating portion 28. Accordingly, the outer periphery of the spiral groove 24 is closed to define a spiral coolant water passage 26.

Figure 2:
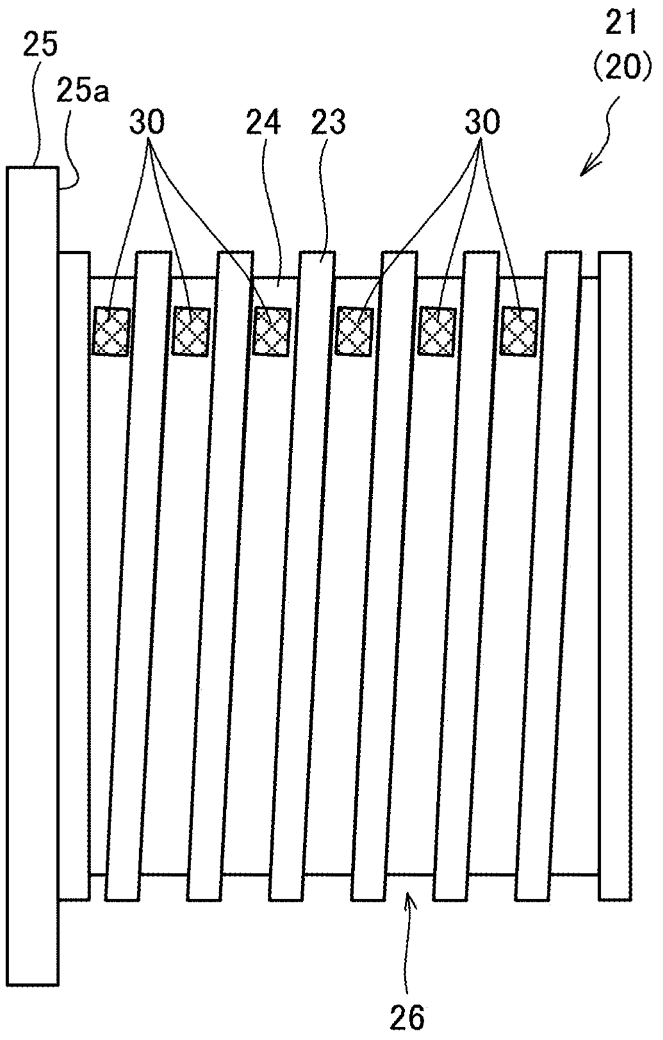
FIG. 2 is a front view of an inner case in a housing.

As shown in FIGS. 1 and 2, the fiber bodies 30 are disposed in the spiral grooves 24. Specifically, the fiber bodies 30 are attached to bottom surfaces of the spiral grooves 24. Each of the fiber bodies 30 is formed in a substantially rectangular shape. The fiber bodies 30 are provided along a flow of the coolant water, that is, parallel to a liquid flow direction.

Each of the fiber bodies 30 is, for example, a copper fiber, but may be another metal fiber, a carbon fiber, a resin fiber, or the like. Since the coolant water passes along surfaces of the fiber bodies 30, turbulence is generated in the coolant water due to disorder of the surfaces caused by the fibers.

In this way, by providing the fiber bodies 30 in the spiral grooves 24, turbulence is caused in the coolant water passage 26, and the cooling efficiency of the rotating electrical machine 10 through the coolant water can be improved. Accordingly, it is possible to provide a novel structure of a use form of the fiber body 30.

Since the coolant water flows along the surface sides of the fiber bodies 30, turbulence can be generated by the fiber bodies 30, and the pressure loss of the coolant water can be reduced. Thus, the energy required to circulate the coolant water can be reduced.

In addition, since the fiber bodies 30 are provided on bottom surfaces of the spiral grooves 24, the disorder of the flow of the coolant water in the vicinity of the bottom surfaces can be increased, and an amount of heat transfer from the bottom surfaces to the coolant water can be increased. Even when the fiber bodies 30 are attached to the bottom surfaces of the spiral grooves 24, there is no significant influence on a flow passage cross-sectional area, and the flow of the coolant water is disturbed in the vicinity of the bottom surfaces, so that the pressure loss of the coolant water can be reduced to be small.

The fiber bodies 30 are intermittently disposed along a liquid flow direction in which the coolant water flows in the spiral grooves 24. Accordingly, the material of the fiber bodies 30 to be used can be reduced. The fiber bodies 30 are disposed at the same position as the spiral grooves 24 in a circumferential direction. That is, the fiber bodies 30 have portions arranged along the axial direction.

Here, since there is a turbulence generation region in which turbulence is generated on the downstream side of the fiber bodies 30, when the fiber bodies 30 are intermittently provided, it is desirable to arrange the fiber bodies 30 at substantially constant intervals. If the fiber bodies 30 are arranged along the axial direction, the fiber bodies 30 are provided at substantially constant intervals in the spiral coolant water flow passage, and the housing 20 can be attached together without being rotated when the fiber bodies 30 are attached, so that the mountability is also good.

It is desirable that an arrangement interval of the fiber bodies 30 be set to be within a turbulence generation region in which the cooling efficiency is high. Further, a plurality of fiber bodies 30 may be attached to the spiral grooves 24 such that a set of the plurality of fiber bodies 30 arranged in the axial direction are provided at a plurality of positions.

Next, the inner case 21 of the housing 20 according to each modification of the embodiment of the present invention will be described with reference to FIGS. 3 to 6. In each modification shown below, differences from the above-described embodiment are mainly described, and configurations having similar functions are denoted by the same reference numerals and the description thereof is omitted.

Figure 3:
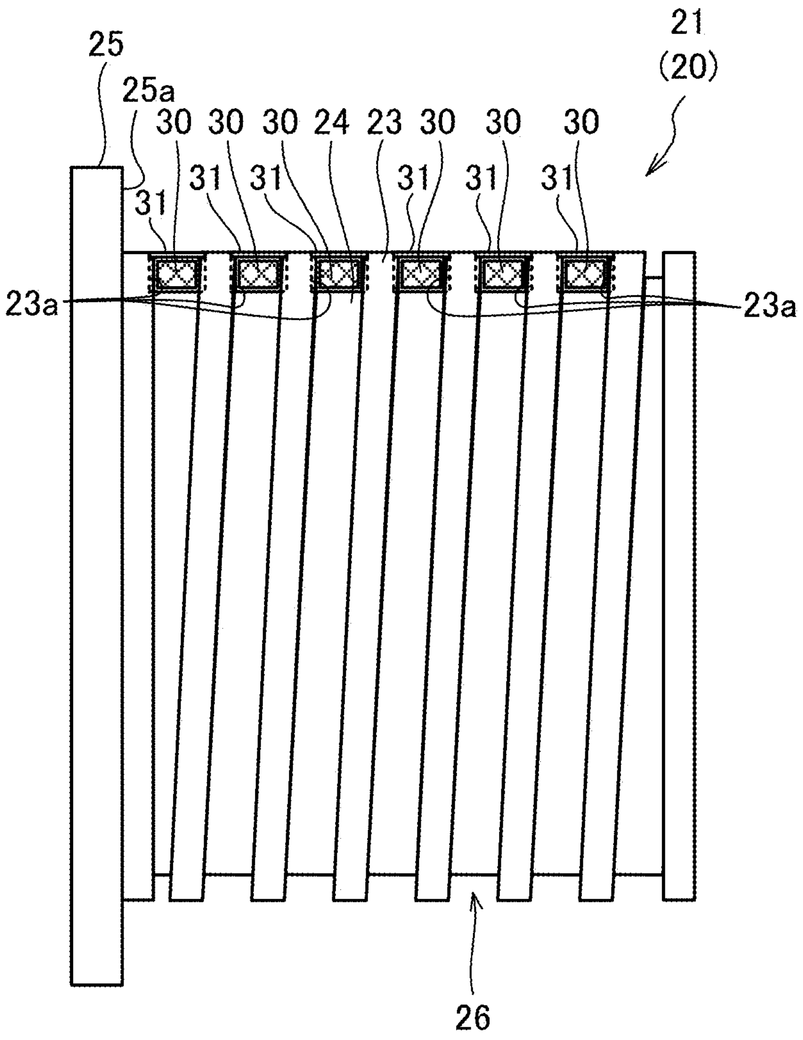
FIG. 3 is a front view of an inner case according to a first modification.
Figure 4:
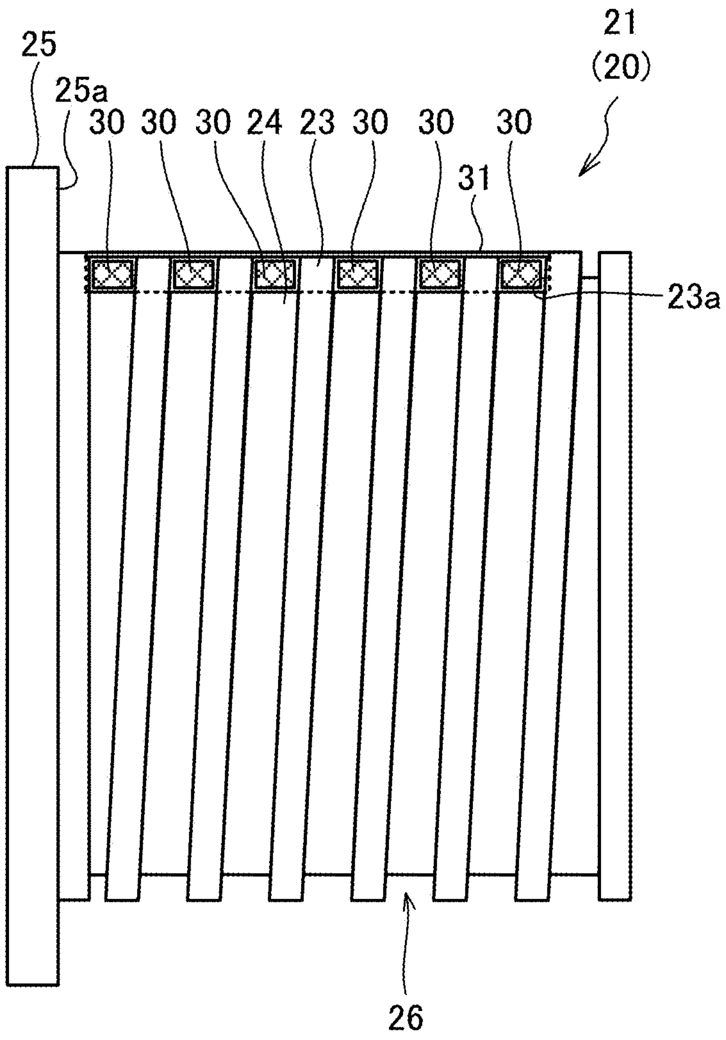
FIG. 4 is a front view of an inner case according to a second modification.
Figure 5:
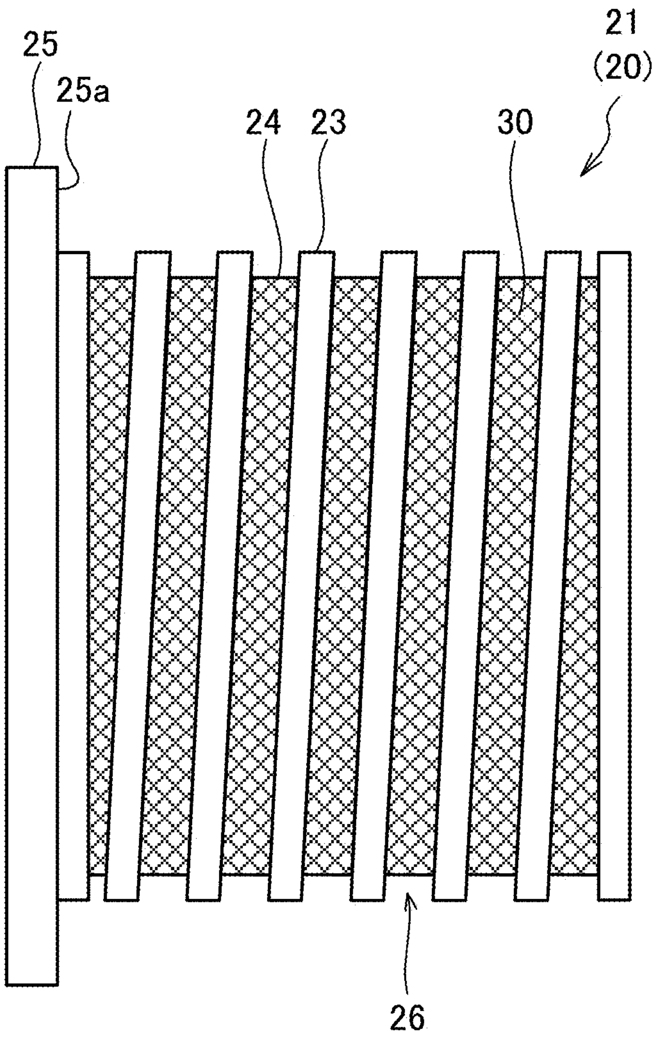
FIG. 5 is a front view of an inner case according to a third modification.
Figure 6:
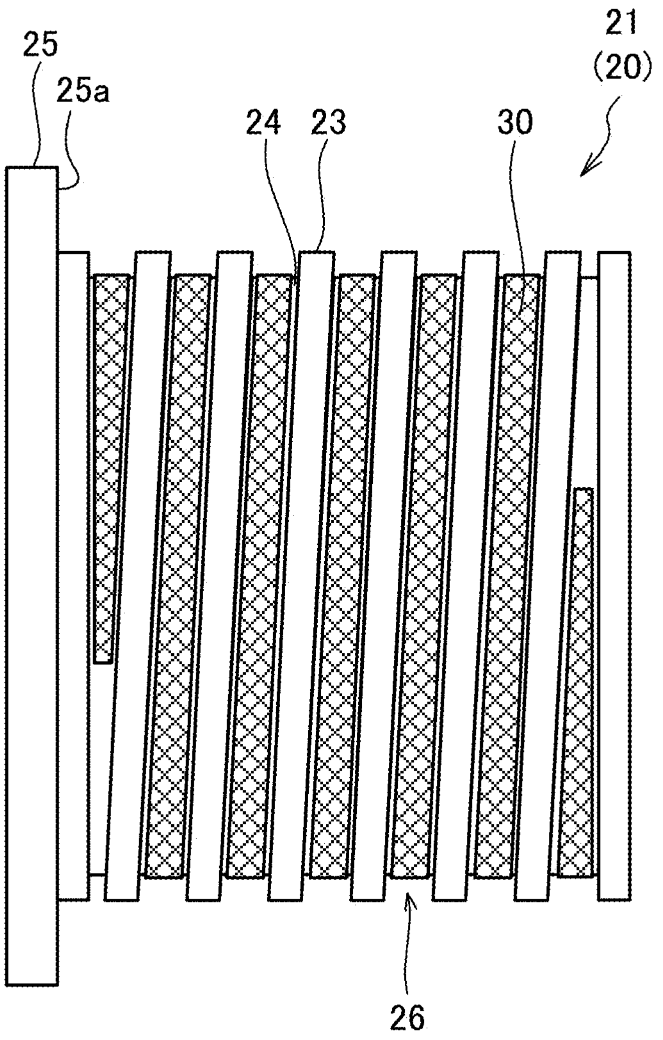
FIG. 6 is a front view of an inner case according to a fourth modification.

FIG. 3 is a front view of the inner case 21 according to a first modification. FIG. 4 is a front view of the inner case 21 according to a second modification. FIG. 5 is a front view of the inner case 21 according to a third modification. FIG. 6 is a front view of the inner case 21 according to a fourth modification.

As shown in FIG. 3, the inner case 21 according to the first modification includes substantially U-shaped grooves 23*a*.

Each of the grooves 23*a* is provided along an intersecting direction intersecting a liquid flow direction in which the coolant water flows in the spiral groove 24. The groove 23*a* is formed to be larger than the spiral groove 24 over the bottom surface and both side surfaces of the spiral groove 24. That is, the groove 23*a* is formed in a concave shape in the spiral groove 24. A plurality of grooves 23*a* are provided at the same position in a circumferential direction. That is, the grooves 23*a* are linearly arranged in the axial direction.

Each of the fiber bodies 30 is formed in a substantially rectangular shape. An outer peripheral edge portion of the fiber body 30 is supported over the entire circumference by a substantially rectangular frame member 31. The fiber bodies 30 are supported by the inner case 21 by fitting the frame member 31 into the grooves 23*a* of the inner case 21.

The fiber bodies 30 are disposed at the same position as the spiral grooves 24 in the circumferential direction. That is, the fiber bodies 30 have portions arranged along the axial direction. The fiber bodies 30 are provided along an intersecting direction intersecting a liquid flow direction in which the coolant water flows in the spiral grooves 24. That is, the coolant water flows through the fiber bodies 30.

When the coolant water passes through the fiber bodies 30, turbulence is generated in the coolant water due to the fibers. Since the fiber bodies 30 are provided to substantially perpendicularly intersect with the liquid flow direction of the coolant water, it is desirable to use fiber bodies having rougher meshes than fiber bodies provided along the liquid flow direction of the above-described embodiment.

In this way, similarly to the above-described embodiment, by providing the fiber bodies 30 in the spiral grooves 24, turbulence is caused in the coolant water passage 26, and the cooling efficiency of the rotating electrical machine 10 through the coolant water can be improved. Accordingly, it is possible to provide a novel structure of a use form of the fiber body 30.

In addition, according to the first modification, the fiber bodies 30 can be easily attached to the housing 20 only by attaching the fiber bodies 30 to attachment grooves 26*a*. An area of the fiber bodies 30 can be reduced as compared with a case where the fiber bodies 30 are attached to the bottom surfaces of the spiral grooves 24.

Since disorder occurs in the entire flow of the coolant water, an arrangement interval can be increased compared to the case where the fiber bodies 30 are attached to the bottom surfaces of the spiral grooves 24. Accordingly, an amount of the fiber bodies 30 to be used can be further reduced.

As in the second modification shown in FIG. 4, the grooves 23*a* may be formed across a plurality of spiral ribs 23 and the spiral grooves 24, and the single frame member 31 fitted in the grooves 23*a* may support the plurality of fiber bodies 30. In this case, the cooling efficiency of the rotating electrical machine 10 through the coolant water can also be improved by causing turbulence in the coolant water passage 26, and the fiber bodies 30 can be more easily attached to the housing 20.

As shown in FIG. 5, in the inner case 21 according to the third modification, the fiber bodies 30 are formed in the same spiral shape as the spiral grooves 24, and are attached to the bottom surfaces of the spiral grooves 24.

According to the third modification, similarly to the above embodiment, by providing the fiber bodies 30 in the spiral grooves 24, turbulence is caused in the coolant water passage 26, and the cooling efficiency of the rotating electrical machine 10 through the coolant water can be improved. Accordingly, it is possible to provide a novel structure of a use form of the fiber body 30.

According to the third modification, the fiber bodies 30 can be easily attached to the housing 20 only by attaching the fiber bodies 30 to the bottom surfaces of the spiral grooves 24.

As in the fourth modification shown in FIG. 5, instead of attaching the fiber bodies 30 to the bottom surfaces of the spiral grooves 24, the fiber bodies 30 may be merely wound around the spiral grooves 24 and accommodated in the spiral grooves 24. In this case, the cooling efficiency of the rotating electrical machine 10 through the coolant water can also be improved by causing turbulence in the coolant water passage 26, and the fiber bodies 30 can be more easily attached to the housing 20.

The configuration and effects of the present embodiment described above are described together below.

(1) The drive unit 1 includes the housing 20 having the spiral grooves 24 formed such that coolant water flows along the circumferential direction, the rotating electrical machine 10 provided in the housing 20, and the fiber bodies 30, and the fiber bodies 30 are disposed in the spiral grooves 24.

According to this configuration, by providing the fiber bodies 30 in the spiral grooves 24, turbulence is caused in the spiral grooves 24, and the cooling efficiency of the rotating electrical machine 10 through the coolant water can be improved. Accordingly, it is possible to provide a novel structure of a use form of the fiber body 30.

(2) The coolant water flows along the surface sides of the fiber bodies 30.

According to this configuration, turbulence can be generated by the fiber bodies 30, and the pressure loss of the coolant water can be reduced.

(3) The coolant water flows through the fiber bodies 30.

According to this configuration, the fiber bodies 30 can be easily attached to the housing 20.

(4) The plurality of fiber bodies 30 are provided, and the plurality of fiber bodies 30 are intermittently disposed along the liquid flow direction in the spiral grooves 24.

According to this configuration, an amount of material to be used can be reduced.

(5) The plurality of fiber bodies 30 are attached to have portions arranged along the axial direction.

In this configuration, since there is a turbulence generation region in which turbulence is generated on the downstream side of the fiber bodies 30, when the fiber bodies 30 are intermittently provided, it is desirable to arrange the fiber bodies 30 at substantially constant intervals. If the fiber bodies 30 are arranged along the axial direction, the fiber bodies 30 are provided at substantially constant intervals in the spiral coolant water flow passage, and the housing 20 can be attached together without being rotated when the fiber bodies 30 are attached, so that the mountability is also good.

(6) The fiber bodies 30 are wound along the spiral grooves 24.

According to this configuration, the fiber bodies 30 can be more easily attached to the housing 20.

Although the embodiments of the present invention have been described above, the above embodiments are merely application examples of the present invention and are not intended to limit the technical scope of the present invention to the specific configuration of the above embodiments.

The present application claims a priority of Japanese Patent Application No. 2022-107072 filed with the Japan Patent Office on Jul. 1, 2022, all the contents of which are hereby incorporated by reference.

DESCRIPTION OF REFERENCE SIGNS

1 drive unit (unit)
10 rotating electrical machine
20 housing
24 spiral groove
30 fiber body

The invention claimed is:

1. A unit comprising:
a housing having a spiral groove formed such that a coolant flows along a circumferential direction;
a rotating electrical machine provided in the housing; and
a fiber body, wherein
the fiber body is disposed in the spiral groove.

2. The unit according to claim 1, wherein
the coolant flows along a surface side of the fiber body.

3. The unit according to claim 1, wherein
the coolant flows through the fiber body.

4. The unit according to claim 1, wherein
a plurality of the fiber bodies are provided, and
the plurality of fiber bodies are intermittently disposed along a liquid flow direction in the spiral groove.

5. The unit according to claim 4, wherein
the plurality of fiber bodies are attached to have portions arranged along an axial direction.

6. The unit according to claim 1, wherein
the fiber body is wound along the spiral groove.

* * * * *